(12) United States Patent
Udagawa

(10) Patent No.: US 7,207,572 B2
(45) Date of Patent: Apr. 24, 2007

(54) GASKET

(75) Inventor: Tsunekazu Udagawa, Ichikawa (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 11/067,932

(22) Filed: Mar. 1, 2005

(65) Prior Publication Data

US 2005/0194749 A1    Sep. 8, 2005

(30) Foreign Application Priority Data

Mar. 8, 2004    (JP) .............................. 2004-064499

(51) Int. Cl.
*F02F 11/00*    (2006.01)
(52) U.S. Cl. ..................................... 277/591; 277/598
(58) Field of Classification Search ................ 277/591, 277/594, 598, 630, 637; 29/888.3
See application file for complete search history.

(56) References Cited

U.S. PATENT DOCUMENTS

| | | | |
|---|---|---|---|
| 4,376,539 A | | 3/1983 | Baldacci |
| 4,690,413 A | * | 9/1987 | Adkins ........................ 277/598 |
| 4,813,691 A | * | 3/1989 | Schoenborn ................. 277/598 |
| 5,433,455 A | * | 7/1995 | Nelson ........................ 277/628 |
| 6,155,045 A | * | 12/2000 | Durr et al. ..................... 60/323 |
| 6,189,895 B1 | * | 2/2001 | Yamada ....................... 277/591 |
| 6,508,474 B2 | * | 1/2003 | Kinoshita .................... 277/592 |
| 2001/0052674 A1 | * | 12/2001 | Egloff ......................... 277/591 |

FOREIGN PATENT DOCUMENTS

| EP | 1 207 323 A2 | 5/2002 |
|---|---|---|
| EP | 1 277 994 A2 | 1/2003 |

* cited by examiner

*Primary Examiner*—Patricia Engle
*Assistant Examiner*—Gilbert Lee
(74) *Attorney, Agent, or Firm*—Manabu Kanesaka

(57) ABSTRACT

A gasket includes a first plate formed of a plurality of first plate pieces. Each plate piece has at least one combustion chamber hole therein, and a device for connecting the first plate pieces together. The first plate pieces are arranged such that the first combustion chamber holes are aligned in series and two first plate pieces situated adjacent to each other are connected through the connecting device.

10 Claims, 6 Drawing Sheets

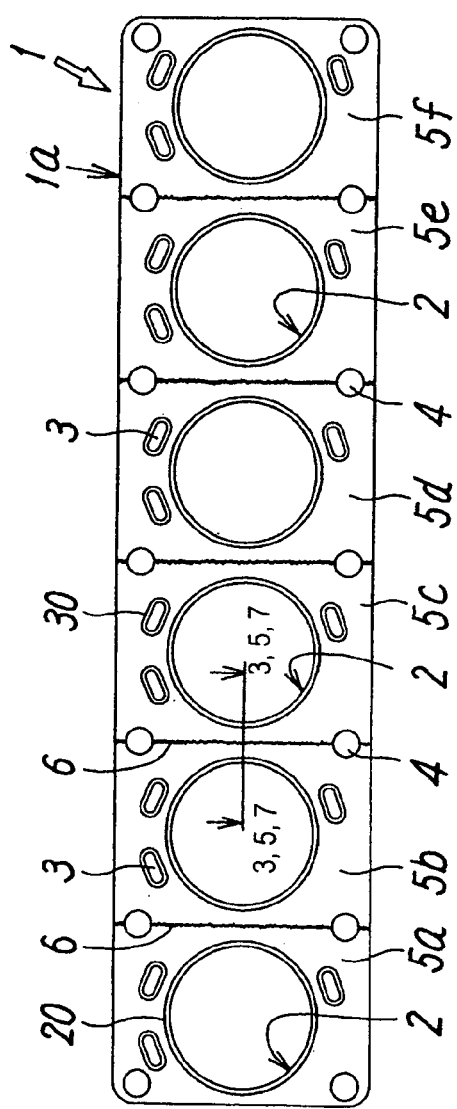
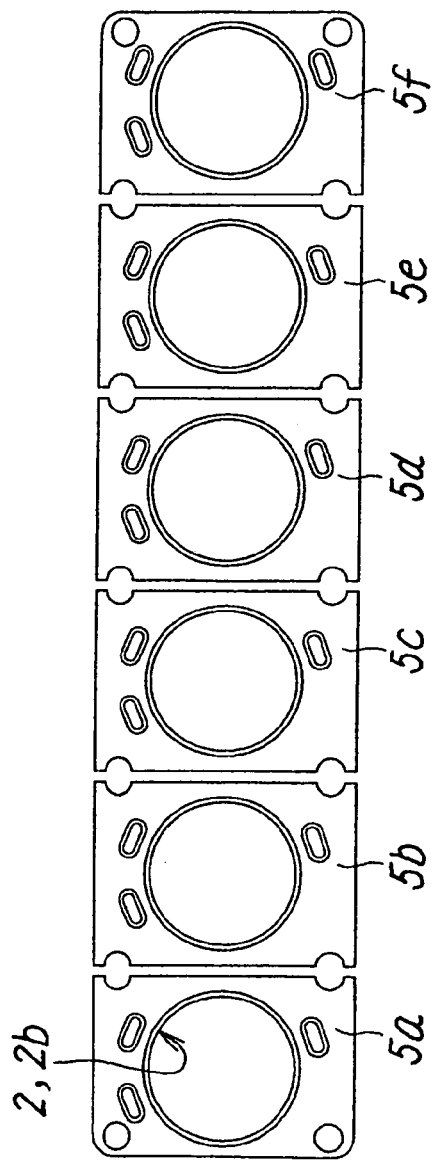

US 7,207,572 B2

GASKET

BACKGROUND OF THE INVENTION AND RELATED ART STATEMENT

The invention relates to a gasket to be disposed between a cylinder block and a cylinder head of a multi-cylinder engine for sealing therebetween.

Heretofore, as shown in FIGS. 9(a) to 9(c), a gasket G disposed between a cylinder block and a cylinder head of a multi-cylinder engine is formed of thin metal sheets with a punching process or pressing process with a mold. Plates P having combustion chamber holes B as many as combustion chambers formed in an engine in series are integrally molded and laminated with a manufacturing machine having a size corresponding to a length of the plate P.

In the conventional gasket G, when the number of the combustion chambers of the engine increases, the overall length of the gasket G becomes longer. Accordingly, it is necessary to increase a size of the mold for molding or the manufacturing machine, thereby increasing production cost. The following Patent Documents relate to the present invention.

Patent Document 1; Japanese Patent Publication (Kokai) No. 2002-147609

Patent Document 2; Japanese Patent Publication (Kokai) No. 08-210181

Patent Document 3; Japanese Patent Publication (Kokai) No. 07-332499

Patent Document 4; Japanese Patent Publication (Kokai) No. 07-027229

The present invention has been made in order to solve the above-mentioned problems, and an object of the invention is to provide a gasket capable of reducing a size of a mold or a manufacturing machine, thereby reducing production cost.

Further objects and advantages of the invention will be apparent from the following description of the invention.

SUMMARY OF THE INVENTION

In order to solve the above problems, according to the present invention, a gasket is formed using a plate formed of a plurality of plate pieces each having one or a plurality of combustion chamber holes arranged in series, respectively. In forming the plate, a plurality of plate pieces is arranged such that the combustion chamber holes are aligned in series, and ends of the adjoining plate pieces are connected each other at connected portions. Specifically, in the gasket, the plate pieces form a single layer and are arranged that the end faces of the adjoining plate pieces contact each other. The end faces are connected each other at the connected portions.

In the gasket described above, a plurality of plates may be laminated to form a multi-layer structure. Alternatively, a single plate may be formed in a single-layer structure, or at least one plate may be laminated with other integrated plates to form a multi-layer structure.

According to the present invention, a gasket is formed using a plate formed of a plurality of plate pieces each having one or a plurality of combustion chamber holes arranged in series, respectively. Each of the plate pieces is formed of a plurality of plate lamination pieces. In forming the plate, a plurality of plate pieces is arranged such that the combustion chamber holes are aligned in series, and ends of the adjoining plate pieces are connected each other at connected portions. Specifically, in the gasket, the plate pieces form a single layer and are arranged that the end faces of the adjoining plate pieces contact each other. The end faces are connected each other at the connected portions.

According to the present invention, a gasket is formed of: a plate substrate integrally molded and having a plurality of combustion chamber holes arranged in series; and a plate formed of a plurality of plate pieces having at least one combustion chamber hole corresponding to each combustion chamber hole of the plate substrate. In forming the plate, a plurality of plate pieces is arranged on the plate substrate such that the corresponding combustion chamber holes are aligned each other, and the end faces of the adjoining plate pieces contact each other or face each other with a regular interval in between. The plate pieces are connected to the plate substrate at the connected portions. Specifically, a plurality of plate pieces is formed in a single-layer structure, and the connected portions are formed above the end faces of the plate pieces or along the end faces.

In the gasket according to the present invention, it is preferable that the connected portions are fused lines formed by fusing. It is preferable that the fusing is laser welding and the like. When the plate includes at least three plate pieces, it is preferable that the plate pieces disposed at both ends of the plate have a thickness less than that of the plate piece disposed in between. It is preferable that the plate piece disposed in between is made of a material harder than that of the plate pieces disposed at the both ends of the plate.

According to the gasket of the present invention, even when a multi-cylinder engine has a large number of combustion chambers arranged in series, it is possible to reduce a size of a mold for a plate molding or a manufacturing machine, thereby reducing production cost.

BRIEF DESCRIPTION OF THE DRAWINGS

FIG. 1 is a plan view showing a gasket according to an embodiment of the present invention;

FIG. 2 is a plan view showing each plate piece of the gasket according to the embodiment of the present invention;

DETAILED DESCRIPTION OF PREFERRED EMBODIMENTS

Figure 3A:
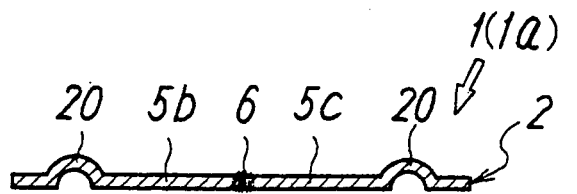
FIGS. 3(a) and 3(b) are cross sectional views of the gasket taken along line 3,5,7—3,5,7 in FIG. 1 according to a first embodiment of the present invention.

Hereinafter, with reference to FIGS. 1 to 8(a)–8(c), gaskets according to embodiments of the present invention will be explained.

A gasket 1 according to the present invention shown in FIG. 1 is to be installed between a cylinder block and a cylinder head of a multicylinder engine having a number of combustion chambers arranged in series for sealing therebetween. The gasket 1 includes: combustion chamber holes 2 respectively corresponding to the combustion chambers and having as many as the combustion chambers arranged in series; a required number of fluid holes 3 bored in appropriate places for passing oil or cooling water therethrough; and a required number of bolt holes 4 bored in appropriate places for passing fastening bolts connecting between the cylinder block and the cylinder head therethrough. The gasket 1 is formed of a plate 1a formed of a number of plate pieces 5a to 5f having the combustion chamber holes as shown in FIG. 2, respectively.

In the above gasket 1, in order to tightly seal holes to be sealed such as the combustion chamber holes 2 and the fluid holes 3, sealing portions 20 and 30 may be formed around the outer circumferences of the holes to be sealed. When the sealing portions 20 and 30 are formed, the sealing portions 20 and 30 may be integrally formed with the plate pieces 5a to 5f, or a separate sealing member may be installed.

Figure 3B:
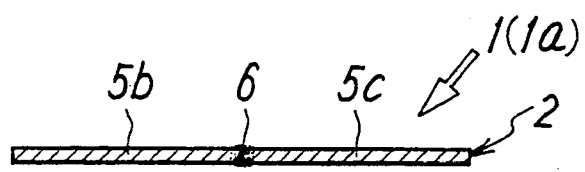

FIGS. 3(a) and 3(b) show the gasket 1 according to a first embodiment of the present invention. In the first embodiment, the single-layer plate pieces 5a to 5f are disposed in a line in such a way that the combustion chamber holes 2 are arranged linearly in series. Ends of the adjoining plate pieces are connected and integrated at connected portions 6 to form the plate 1a. The gasket 1 is formed of the single-layer plate 1a alone.

More specifically, each plate 5a to 5f is formed in a roughly rectangular shape with a same width of a thin metal sheet, respectively. Each plate 5a to 5f includes: a combustion chamber hole 2; a required number of fluid holes 3; and a required number of bolt holes 4. The plate pieces 5a to 5f as many as the combustion chambers arranged in series in the multi-cylinder engine are disposed in such a way that end faces of the adjoining plate pieces contact with each other. The contact end faces are welded and integrated by weld lines (connected portions 6) by welding, so that the roughly rectangular plate 1a, i.e., the gasket 1, is formed.

As shown in FIG. 2, the end faces of the plate pieces 5a to 5f welded together are formed linearly in the width direction across a pair of bolt holes 4 disposed between the combustion chamber holes 2. As a result, as shown in FIG. 1, the weld lines 6 are also formed linearly in the width direction across the bolt holes 4. In the gasket 1 of the first embodiment, as shown in FIG. 1, each weld line 6 welding the end faces of the plate pieces 5a to 5f is respectively formed at a position wherein the weld line 6 does not cut across the sealing portions 20 and 30 surrounding the outer circumferences of the holes to be sealed (the combustion chamber holes 2 or the fluid holes 7), thereby maintaining sealing quality of the holes to be sealed.

In the gasket 1 shown in FIG. 3(a), bead portions as the sealing portions 20 and 30 integrally project around each combustion chamber hole 2 and fluid hole 7 of the plate pieces 5a to 5f, respectively. In the gasket 1 shown in FIG. 3(b), the plate pieces 5a to 5f are formed of flat plates, respectively, so that a separate sealing member (not shown) can be installed around the combustion chamber holes 2 or the fluid holes 7 as described above.

The gasket 1 of the first embodiment has the above-described structure. Accordingly, even when the number of combustion chambers serially formed in the multi-cylinder engine increases, it is possible to reduce a size of a mold for molding each plate piece 5a to 5f or overall manufacturing equipment for the gasket 1. Even when a design of the engine is partially changed, it is necessary to change only a mold for molding a plate piece corresponding to the change among the plate pieces 5a to 5f. Accordingly, the mold for molding the plate pieces 5a to 5f can be effectively used, and production cost of the gasket 1 can be reduced.

A method of manufacturing the gasket 1 according to the first embodiment will be explained next. First, the plate pieces 5a to 5f respectively having the combustion chamber hole 2, the fluid holes 3, and the bolt holes 4 are molded using a thin metal sheet formed by a punching process or press work with the mold as many as the combustion chambers serially formed in the corresponding multi-cylinder engine. The sealing portions 20 and 30 such as, for example, the bead portions shown in FIG. 3(a) may be integrally formed around the holes to be sealed (the combustion chamber holes 2 and the fluid holes 3) of each plate piece 5a to 5f. Next, the plate pieces 5a to 5f are arranged linearly such that the end faces of the adjoining plate pieces contact with each other. The contact end faces of the plate pieces 5a to 5f are welded and integrated together by laser welding and the like, thereby forming the plate 1a, i.e., the gasket 1.

Figure 4:
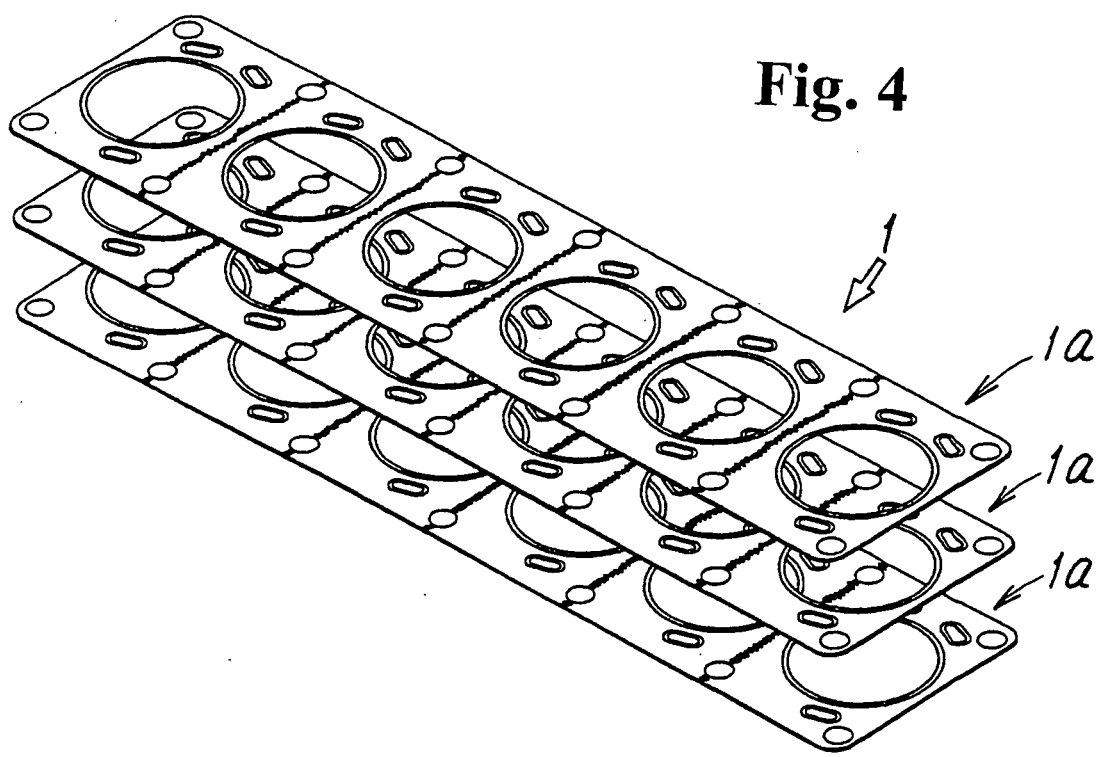
FIG. 4 is a perspective view showing the gasket according to a second embodiment of the present invention.

FIG. 4 shows the gasket 1 according to a second embodiment of the present invention. In the second embodiment, a plurality of plates 1a (in this case, three plates) having the same structure as the first embodiment is laminated and connected each other with an appropriate method to form the gasket 1. Other structural features, a manufacturing method, and an operational effect of the gasket 1 according to the second embodiment are basically the same as those of the first embodiment, and explanations thereof are omitted.

Figure 5A:
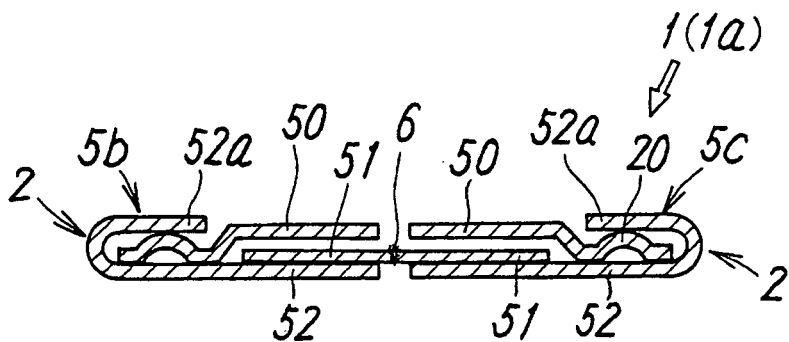
FIGS. 5(a) and 5(b) are cross sectional views of the gasket taken along line 3,5,7—3,5,7 in FIG. 1 according to a third embodiment of the present invention.
Figure 5B:
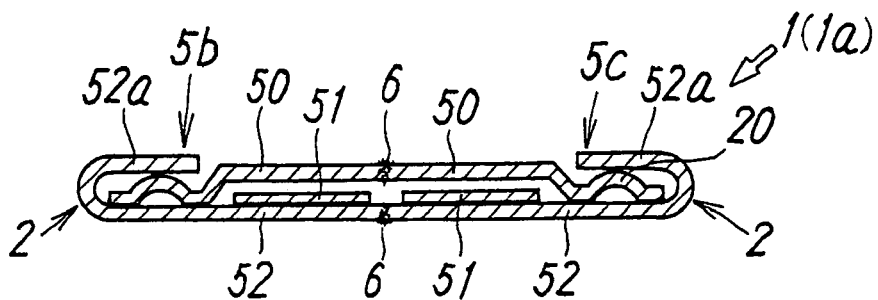
Figure 6:
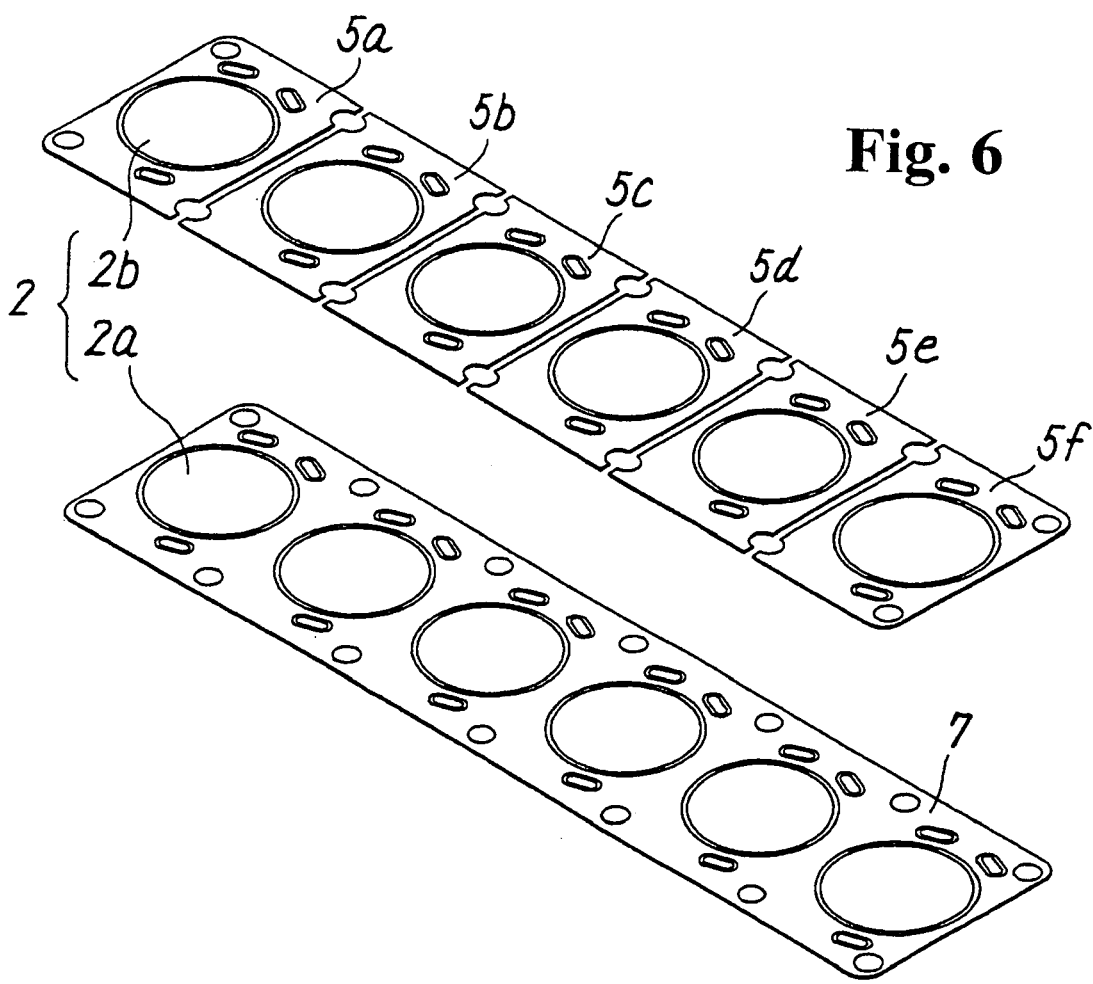
FIG. 6 is a perspective view showing the gasket according to a fourth embodiment of the present invention.

FIGS. 5(a) and 5(b) show the gasket 1 according to a third embodiment of the present invention. Each plate piece 5a to 5f in the third embodiment is laminated with a plurality of plate lamination pieces 50 to 52, and has one combustion chamber hole 2, respectively. The plate pieces 5a to 5f are arranged in a line in such a way that the combustion chamber holes 2 are arranged in series. Ends of at least a pair of plate lamination pieces laminated in the same position of the adjoining plate pieces are connected each other at the connected portions 6, so that the plate pieces 5a to 5f are unified to form the plate 1a. In the third embodiment, the gasket 1 is formed of the single plate 1a.

More specifically, the plate lamination pieces 50 to 52 are formed of three thin metal sheets having holes for forming the combustion chamber holes 2. The plate lamination pieces 50 to 52 are laminated in such a way that centers of the holes are aligned each other, so that each plate piece 5a to 5f is formed in a roughly rectangular shape with a same width, respectively. Diameters of the holes for forming the combustion chamber holes 2 become smaller in the order of the plate lamination pieces 51, 50, and 52.

At the end of each connected portion 6 of each plate piece 5a to 5f, second plate lamination pieces 51 are held between a first plate lamination piece 50 and a third plate lamination piece 52. At the outer circumference of each combustion chamber hole 2 of each plate piece 5a to 5f, the circumference of the hole of the third plate lamination piece 52 is folded back, so that a peripheral border of the combustion chamber hole 2 and a folded piece 52a are formed. Around the hole of the first plate lamination piece 50, bead portions as the sealing portions 20 integrally project toward the folded piece 52a in such a way that the bead portions surround the outer circumference of the combustion chamber hole 2. The folded piece 52a is folded back to cover the peripheral border of the hole of the first plate lamination piece 50 and the bead portions 20, thereby forming a grommet portion.

FIGS. 5(a) and 5(b) show various types of configurations according to the third embodiment. First, in the first configuration of the gasket 1 shown in FIG. 5(a), the plate pieces 5a to 5f are disposed in such a way that the end faces of the second plate lamination pieces 51 of the adjoining plate pieces contact with each other. The contact end faces are welded and unified together at weld lines (the connected portions 6) by welding, so that the roughly rectangular plate 1a, i.e., the gasket 1, is formed. In the second configuration of the gasket 1 shown in FIG. 5(b), the plate pieces 5a to 5f are disposed in such a way that the end faces of the first and third plate lamination pieces 50 and 52 of the adjoining plate pieces contact with each other. The contact end faces are welded and unified together at weld lines 6 by welding, so that the roughly rectangular plate 1a, i.e., the gasket 1, is formed.

A manufacturing method of the gasket 1 according to the third embodiment will be explained next. First, a plurality of plate lamination pieces 50 to 52 having one hole for forming each combustion chamber hole 2 is formed of a thin metal sheet formed by a punching process or press work with a mold. If necessary, the sealing portions such as the bead portions may be integrally formed around the holes to be sealed (holes for forming the combustion chamber holes 2 and the fluid holes 3) in each plate lamination piece 50 to 52. The plate lamination pieces 50 to 52 are laminated in such a way that the holes are aligned. A grommet portion is formed by a bending process. Accordingly, the plate pieces 5a to 5f are formed as many as the combustion chambers disposed in series in the corresponding multi-cylinder engine.

Next, a plurality of plate pieces 5a to 5f is disposed in a line in such a way that the end faces of at least a pair of plate lamination pieces laminated in the same position of the adjoining plate pieces contact with each other. The end faces are welded together by the laser welding and the like to unify the plate pieces 5a to 5f. Accordingly, the plate 1a, i.e., the gasket 1, is formed. Other structural features, a manufacturing method, and an operational effect of the gasket 1 according to the third embodiment are basically the same as those of the first embodiment, and explanations thereof are omitted.

FIGS. 6 and 7(a) to 7(f) show the gasket 1 according to a fourth embodiment of the present invention. In the fourth embodiment, the plate 1a is formed of a plate substrate 7 integrally molded in a roughly rectangular shape and having a plurality of first combustion chamber holes 2a arranged in series and; and the plate pieces 5a to 5f with a width same as the plate substrate 7 as many as the first combustion chamber holes 2a each having one second combustion chamber hole 2b corresponding to the first combustion chamber hole 2a. Accordingly, the gasket 1 is formed of the single plate 1a.

More specifically, the plate pieces 5a to 5f and the plate substrate 7 are formed of thin metal sheets. The plate pieces 5a to 5f are arranged on the plate substrate 7 such that the corresponding combustion chamber holes 2a and 2b are aligned each other, and the end faces of the adjoining plate pieces 5a to 5f contact with each other or face each other with a regular interval 8 in between. The plate pieces 5a to 5f are welded together at the weld lines 6 with respect to the plate substrate 7. Accordingly, the roughly rectangular plate 1a, i.e., the gasket 1, having the combustion chamber holes 2 arranged in series is formed. In the plate pieces 5a to 5f and the plate substrate 7, the required number of fluid holes 3 and bolt holes 4 are formed respectively in appropriate positions.

The end faces of the plate pieces 5a to 5f are linearly arranged in the width direction across the bolt holes 4. The weld lines 6 welding the plate pieces 5a to 5f with respect to the plate substrate 7 are also linearly arranged above the end faces or along the end faces. As shown in FIG. 1, in the gasket 1 according to the fourth embodiment, each weld line 6 is respectively formed in the position wherein the weld line 6 does not cut across the sealing portions 20 and 30 surrounding the outer circumferences of the holes to be sealed (the combustion chamber holes 2 or the fluid holes 3), thereby maintaining sealing quality of the holes to be sealed.

The gasket 1 with the above-mentioned structure according to the fourth embodiment has the same effect as the gasket 1 according to the first embodiment. The plate substrate 7 fitting the plate pieces 5a to 5f is integrally molded in a predetermined shape wherein the combustion chamber holes 2a are disposed in series, thereby sufficiently ensuring strength of the gasket 1 according to the fourth embodiment.

FIGS. 7(a) to 7(f) show various configurations according to the fourth embodiment. First, in the gasket 1 shown in FIGS. 7(a) to 7(c), each plate piece 5a to 5f is arranged on the plate substrate 7 in a state wherein the end faces contact with each other. The adjoining plate pieces 5a to 5f are welded with respect to the plate substrate 7 at one weld line 6 formed on the end faces of the plate pieces 5a to 5f. The adjoining plate pieces 5a to 5f are also welded all together. Accordingly, the adjoining plate pieces 5a to 5f are welded with respect to the plate substrate 7 all together at one weld line 6, thereby reducing the number of welding and production cost.

Figure 7A:
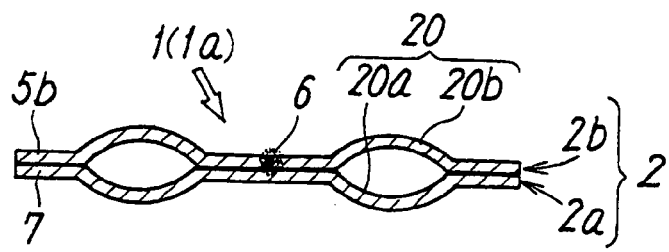
FIGS. 7(a) to 7(f) are cross sectional views of the gasket taken along line 3,5,7—3,5,7 in FIG. 1 according to the fourth embodiment of the present invention.
Figure 7B:
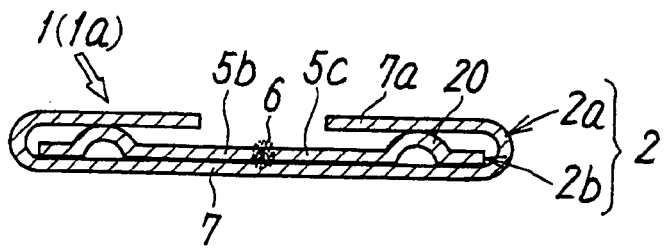
Figure 7C:
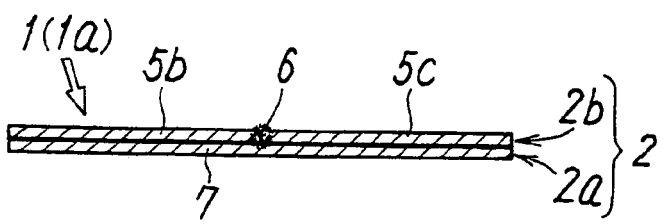
Figure 7D:
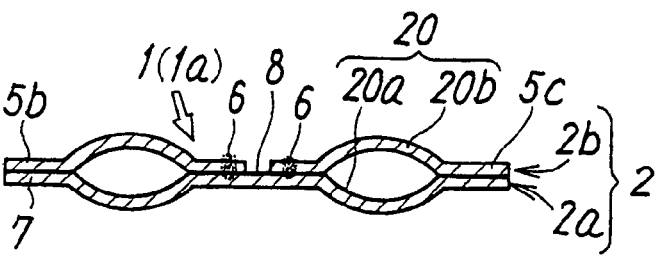
Figure 7E:
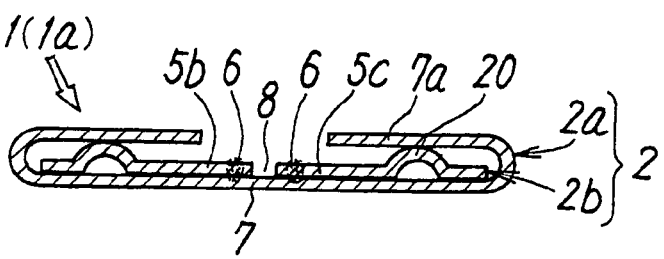
Figure 7F:
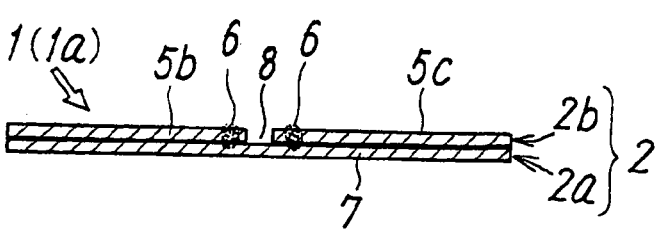

In the gasket 1 shown in FIGS. 7(d) to 7(f), each plate piece 5a to 5f is arranged on the plate substrate 7 in the state wherein the end faces face each other with the regular interval 8 in between. Each plate piece 5a to 5f is welded with respect to the plate substrate 7 respectively at two weld lines 6 separately formed along the end face of each plate piece 5a to 5f. When each plate piece 5a to 5f is arranged on the plate substrate 7 close to the end face of each adjoining plate piece, the adjoining plate pieces can be welded with respect to the plate substrate 7 all together at one weld line 6, in the same way when the end faces contact with each other.

In the gasket 1 shown in FIGS. 7(a) and 7(d), bead portions 20a and 20b project in a reversed direction on the outer circumference of each combustion chamber hole 2a, 2b of the plate pieces 5a to 5f and the plate substrate 7 as the sealing portions 20 surrounding each combustion chamber hole 2a and 2b, respectively. Each combustion chamber hole 2a and 2b of the plate pieces 5a to 5f and the plate substrate 7 has a same diameter, and peripheral edges thereof are aligned.

In the gasket 1 shown in FIGS. 7(b) and 7(e), the bead portions project on the outer circumference of each combustion chamber hole 2b of the plate pieces 5a to 5f in the opposite direction of the plate substrate 7 as the sealing portions 20 surrounding each combustion chamber hole 2b, respectively. On the outer circumference of each combustion chamber hole 2a of the plate substrate 7, each folded piece 7a is provided. The folded piece 7a is folded toward the opposite face of the plate substrate 7 of the plate pieces 5a to 5f to cover the peripheral edges of the combustion chamber holes 2b of the plate pieces 5a to 5f and the bead portions 20, thereby forming the grommet portion.

In the gasket 1 shown in FIGS. 7(c) and 7(f), the plate pieces 5a to 5f and the plate substrate 7 are made of the flat plates, respectively. Each combustion chamber hole 2a, 2b has a same diameter, and peripheral edges thereof are aligned.

A manufacturing method of the gasket 1 according to the fourth embodiment will be explained next. First, the plate substrate 7 having the combustion chamber holes 2a as many as the combustion chambers serially disposed in the corresponding multi-cylinder engine, the bolt holes 4, and the fluid holes 7 is integrally molded using the thin metal sheet by the punching process or press work with the mold. If necessary, the sealing portions such as the bead portions may be integrally formed around the holes to be sealed (the combustion chamber holes 2a and the fluid holes 3) of the plate substrate 7.

The plate pieces 5a to 5f having one combustion chamber hole 2b corresponding to each combustion chamber hole 2a of the plate substrate 7, the fluid holes 3, and the bolt holes 4 are molded as many as the combustion chamber holes 2a of the plate substrate 7 using the thin metal sheet by the punching process or press work with the mold. If necessary, the sealing portions such as the bead portions may be integrally formed around the holes to be sealed (the combustion chamber holes 2b and the fluid holes 3) of the plate pieces 5a to 5f.

Next, a plurality of plate piece 5a to 5f is arranged in series on the plate substrate 7 such that the corresponding combustion chamber holes 2a and 2b are aligned with each other, and the end faces of the adjoining plate pieces 5a to 5f contact with each other or face each other with the regular interval 8 in between. The plate pieces 5a to 5f are welded together by the laser welding with respect to the plate substrate 7 over the end faces or along the end faces, thereby forming the plate 1a, i.e., the gasket 1. The grommet portion may be formed with the bending process as needed.

Figure 8A:
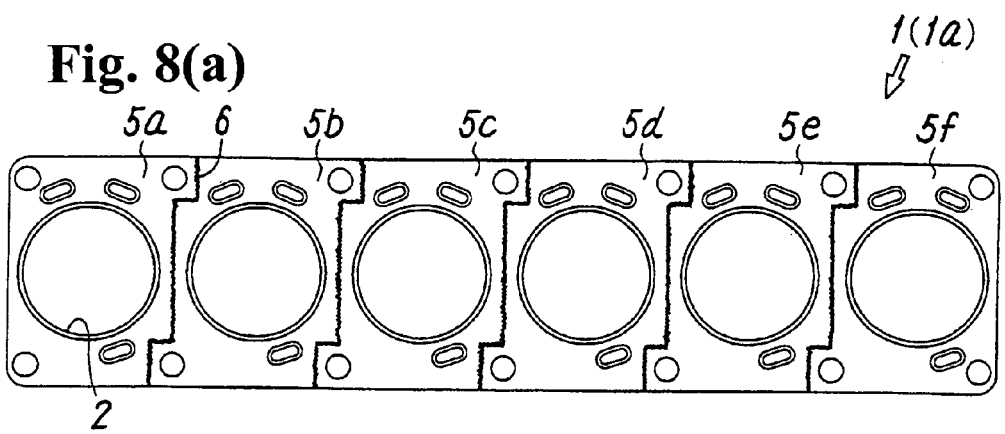
FIGS. 8(a) to 8(d) are plan views showing modifications of the gasket according to the present invention.

In the gasket 1 according to the embodiments, the contact end faces of the plate pieces 5a to 5f and the weld lines 6 are formed in a straight line across each pair of bolt holes 4 disposed between the adjoining combustion chamber holes. Alternatively, for example, as shown in FIG. 8(a), the end faces and the weld lines 6 may be formed in a step pattern away from the bolt holes 4, thereby maintaining strength of the bolt holes 4.

Figure 8B:
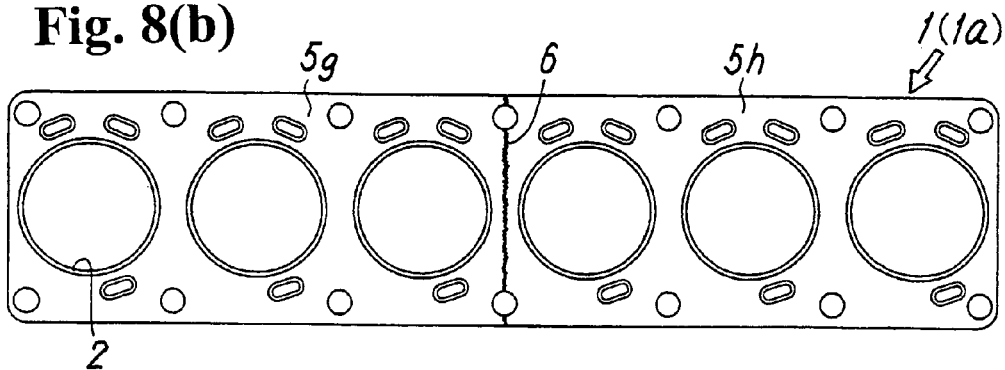
Figure 8C:
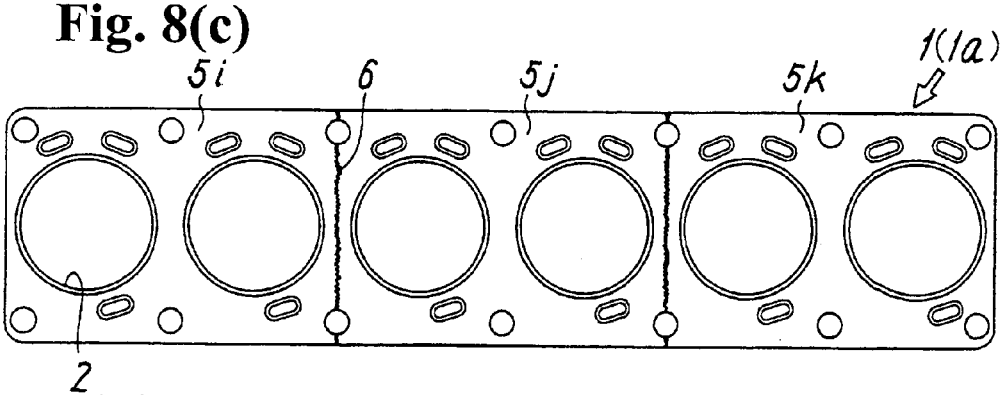
Figure 8D:
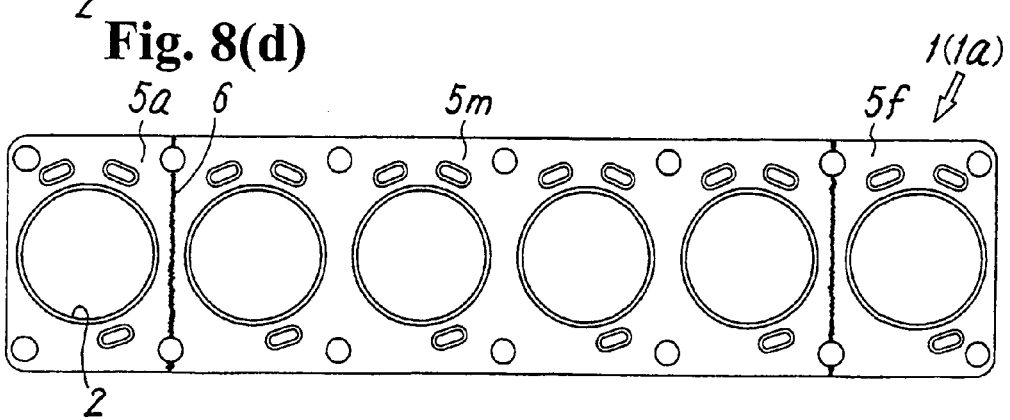
Figure 9A:
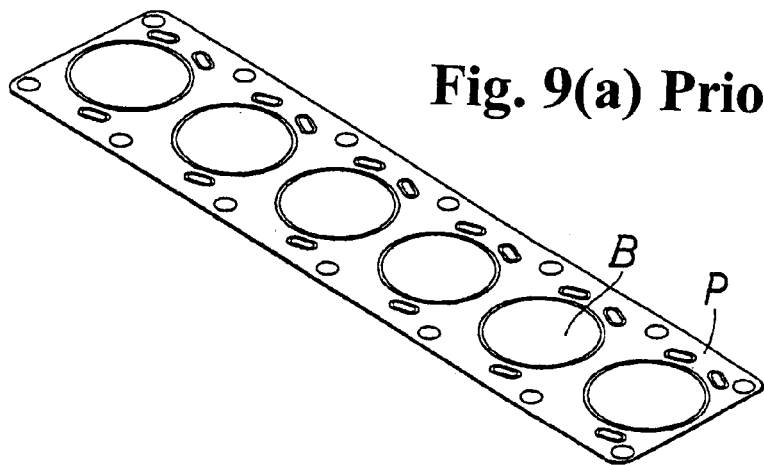
FIGS. 9(a) to 9(c) are perspective views showing a conventional gasket and a method of manufacturing the same.
Figure 9B:
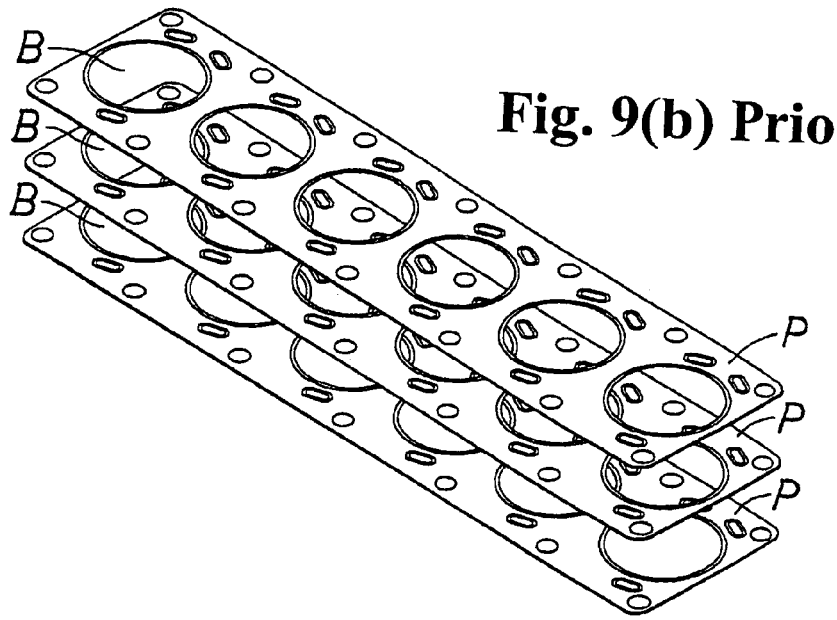
Figure 9C:
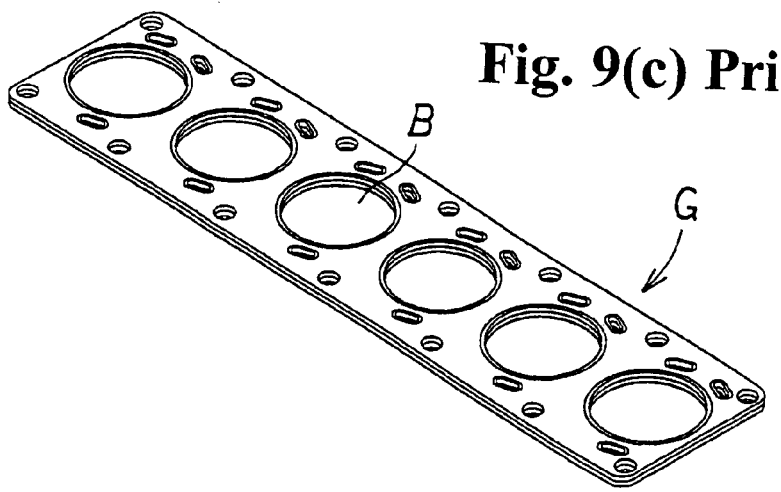

In the embodiments, the gasket 1 is formed of six plate pieces 5a to 5f having one combustion chamber hole, respectively. Alternatively, as shown in FIG. 8(b), for example, two plate pieces 5g and 5h having three combustion chamber holes arranged in series may be used. As shown in FIG. 8(c), three plate pieces 5i to 5h having two combustion chamber holes arranged in series may be used. As shown in FIG. 8(d), the plate pieces 5a and 5f having one combustion chamber hole at each of both ends may be used, and a plate piece 5m having four combustion chamber holes may be disposed between the plate pieces 5a and 5f. That is, the gasket 1 has a plurality of plate pieces each having at least one combustion chamber hole.

The gasket 1 typically includes several bolt holes 4 at positions (both ends portions) outside a pair of combustion chamber holes disposed at the both ends, and is disposed and fastened between the cylinder block and the cylinder head by the fastening bolts inserted into the bolt holes 4. In this case, a surface pressure may not be applied uniformly between the cylinder block and the cylinder head and increase, i.e., higher at the both end portions than at an intermediate portion. Accordingly, when the gasket 1 has three or more plate pieces, the plate pieces disposed at the both ends (in the above embodiments, 5a and 5f) have a thickness smaller than that of the plate pieces disposed between the plate pieces 5a and 5f (in the above embodiments, 5b to 5e), thereby obtaining uniform surface pressure and improving sealing quality of the gasket 1. It is preferable that the plate pieces disposed between the plate pieces 5a and 5f are made of a material harder than that of the plate pieces disposed at the both ends.

In the embodiments, when the plate pieces disposed in the middle of the gasket 1 (in the above embodiment, 5b to 5e) have a same shape, and the fluid holes 3 and the bolt holes 4 are evenly arranged around the combustion chamber holes 2, the plate pieces disposed in the middle can be standardized and molded in a common mold. The plate pieces are welded with various welding methods such as contact resistance welding and the like as well as laser welding.

In the invention, the plate pieces 5a–5f are laterally connected together directly by weld lines 6, or are spaced apart from each other and connected together through another plate. Means for connecting the (first) place pieces includes direct connection of the place pieces and indirect connection through another plate.

The disclosure of Japanese Patent Application No. 2004-064499, filed on Mar. 8, 2004, is incorporated in the application.

While the invention has been explained with reference to the specific embodiments of the invention, the explanation is illustrative and the invention is limited only by the appended claims.

What is claimed is:

1. A gasket comprising:
    a first plate comprising a plurality of first plate pieces formed separately, each having at least one combustion chamber hole therein, and means for connecting the first plate pieces together, said first plate pieces being arranged such that the first combustion chamber holes are aligned in series and two first plate pieces situated adjacent to each other are connected through the connecting means,
    wherein said first plate pieces formed separately are aligned laterally without overlapping each other to form a single layer structure, and are directly laterally connected together at lateral ends thereof by said connecting means.

2. A gasket according to claim 1, further comprising a second plate laminated with the first plate and connected thereto.

3. A gasket according to claim 1, further comprising a second plate laminated with the first plate, said second plate having a length same as that of the first plate and being formed of one piece without connection.

4. A gasket according to claim 1, further comprising a second plate formed of a plurality of second plate pieces having a structure same as that of the first plate pieces, said second plate pieces being disposed on the first plate pieces without fixing thereto.

5. A gasket according to claim 1, wherein each of the first plate pieces further includes at least one liquid hole, bolt holes and sealing means around the combustion chamber hole.

6. A gasket according to claim 5, wherein each of the first plate pieces includes parts of the bolt holes so that when the first plate pieces are joined together, the parts of the bolt holes adjacent to each other form one complete bolt hole, respectively.

7. A gasket according to claim 5, wherein each of the liquid hole and each of the bolt holes are completely located inside each of the first plate pieces.

8. A gasket according to claim 1, wherein one first plate piece includes a plurality of combustion chamber holes, and is connected with another first plate piece with one or a plurality of combustion chamber holes.

9. A gasket according to claim 1, wherein said means for connecting the first pieces is welding and forms a connected portion.

10. A gasket according to claim 1, wherein said first plate pieces abut against each other at the lateral ends and are connected directly by welding as the means for connecting the first pieces.

* * * * *